United States Patent
Stapleton

(10) Patent No.: US 9,084,946 B2
(45) Date of Patent: Jul. 21, 2015

(54) VORTEX SEPARATOR AND SEPARATION METHOD

(71) Applicant: Hamilton Sundstrand Space Systems International Inc., Windsor Locks, CT (US)

(72) Inventor: Thomas J. Stapleton, Southwick, MA (US)

(73) Assignee: Hamilton Sundstrand Space Systems International Inc., Windsor Locks, CT (US)

( * ) Notice: Subject to any disclaimer, the term of this patent is extended or adjusted under 35 U.S.C. 154(b) by 102 days.

(21) Appl. No.: 13/858,561

(22) Filed: Apr. 8, 2013

(65) Prior Publication Data

US 2014/0298991 A1 Oct. 9, 2014

(51) Int. Cl.
*B01D 19/00* (2006.01)
*B01D 53/22* (2006.01)
*B04C 3/06* (2006.01)
*B04C 9/00* (2006.01)

(52) U.S. Cl.
CPC ........ *B01D 19/0057* (2013.01); *B01D 19/0031* (2013.01); *B04C 3/06* (2013.01); *B04C 2009/004* (2013.01)

(58) Field of Classification Search
CPC ........... B01D 19/0031; B01D 19/0057; B01D 19/0094; B01D 53/22; B01D 52/228; B01D 71/26; B01D 71/36; B04C 3/06; B04C 2009/004
USPC ............. 95/46, 421; 96/6, 195, 196, 208, 209
See application file for complete search history.

(56) References Cited

U.S. PATENT DOCUMENTS

| | | | |
|---|---|---|---|
| 3,296,807 A | 1/1967 | Fekete | |
| 4,141,705 A | 2/1979 | Compolong | |
| 4,162,901 A | 7/1979 | Enegess | |
| 5,476,537 A | 12/1995 | Yi et al. | |
| 5,622,545 A * | 4/1997 | Mazzei et al. | 96/210 |
| 5,849,065 A * | 12/1998 | Wojke | 96/211 |
| 6,176,903 B1 * | 1/2001 | Wamsiedler | 96/208 |
| 6,176,904 B1 * | 1/2001 | Gupta | 96/209 |
| 6,746,514 B2 * | 6/2004 | Bedingfield et al. | 95/46 |
| 7,985,279 B2 | 7/2011 | Kondo et al. | |
| 8,048,209 B2 * | 11/2011 | Dannenmaier et al. | 96/6 |
| 2004/0144256 A1 * | 7/2004 | Mazzei | 96/209 |

(Continued)

FOREIGN PATENT DOCUMENTS

DE   10 2007036893 A1 *  2/2009  ............. B01D 61/14
DE   102007036893 A1     2/2009

(Continued)

OTHER PUBLICATIONS

Machine translation of German Patent Application Publication DE 10 2007 036 893 A1. Retrieved from translationportal.epo.org on Jan. 23, 2015.*

(Continued)

*Primary Examiner* — Jason M Greene
(74) *Attorney, Agent, or Firm* — Kinney & Lange, P.A.

(57) ABSTRACT

A vortex separator includes a vortex chamber having a circular cross section, an inlet for delivering a fluid to the vortex chamber, a gas outlet through which gas present in the fluid exits the vortex chamber, a membrane positioned to substantially prevent liquid from passing through the gas outlet, and a liquid outlet through which liquid present in the fluid exits the vortex chamber.

8 Claims, 2 Drawing Sheets

(56) References Cited

U.S. PATENT DOCUMENTS

2010/0107878 A1* 5/2010 Crowder et al. .................. 96/6
2014/0058095 A1* 2/2014 Rende et al. .................. 540/485

FOREIGN PATENT DOCUMENTS

| EP | 1656872 | A2 | 5/2006 |
| NL | 8900810 | A | 7/1990 |
| WO | 0059608 | A1 | 10/2000 |

OTHER PUBLICATIONS

European Patent Office, Extended European Search Report, Sep. 12, 2014, 6 pages.

* cited by examiner

VORTEX SEPARATOR AND SEPARATION METHOD

BACKGROUND

In certain applications, the presence of a gas entrained in a liquid can be undesirable or cause problems. For example, in microgravity, gas bubbles must be removed from drinking water. Additionally, high gas content in a liquid that is pumped can result in vapor lock or pump cavitation. Gas present in a liquid that is delivered through microchannels can clog the channels and have other negative impacts. To reduce the potential problems caused by the presence of a gas within a liquid, the gas is removed from the liquid. In microgravity environments, gas removal from a liquid is difficult.

Techniques for removing gases from liquids in microgravity environments include centrifugal separation, membrane systems, condensation systems and capillary methods. A centrifugal separator spins fluid via a spinning housing to create a buoyancy force that separates the gas from the liquid. In membrane systems, gas is able to migrate across a membrane while the liquid cannot (e.g., a hydrophobic membrane where the liquid is water). Condensation systems cause water to condense out of air as the air comes into contact with cold surfaces. In capillary methods, liquid is allowed to exit a vessel as a result of capillary action. While each of these methods may be suitable for removing gases from liquids in some situations, the necessary components can be heavy, expensive to operate or maintain, or complicated.

SUMMARY

A vortex separator includes a vortex chamber having a circular cross section, an inlet for delivering a fluid to the vortex chamber, a gas outlet through which gas present in the fluid exits the vortex chamber, a membrane positioned to substantially prevent liquid from passing through the gas outlet, and a liquid outlet through which liquid present in the fluid exits the vortex chamber.

A vortex chamber includes a first end, a second end generally opposite the first end, a wall extending from the first end to the second end, a fluid inlet located on the wall near the first end, a liquid outlet located on the wall near the second end, a gas outlet located along the second end, and a membrane for allowing the transmission of a gas through the gas outlet but substantially preventing transmission of liquids through the gas outlet.

A method for separating a gas from a liquid includes delivering a fluid containing a liquid and a gas to a vortex chamber through a nozzle at a velocity and direction sufficient to create vortical flow of the fluid within the vortex chamber, removing the liquid contained within the fluid from the vortex chamber through a liquid outlet, and removing the gas contained within the fluid from the vortex chamber through a gas outlet. One of the vortex chamber or the gas outlet includes a membrane that prevents liquid from exiting through the gas outlet.

DETAILED DESCRIPTION

According to embodiments of the present invention, one or more gases are separated from a liquid using a vortex separator. As described below, centrifugal forces cause the gas(es) to separate from the liquid, with the gas exiting the vortex separator through one outlet and the liquid through another. While originally designed for operation in microgravity environments, the vortex separator described herein can also find use in terrestrial applications.

Figure 1:
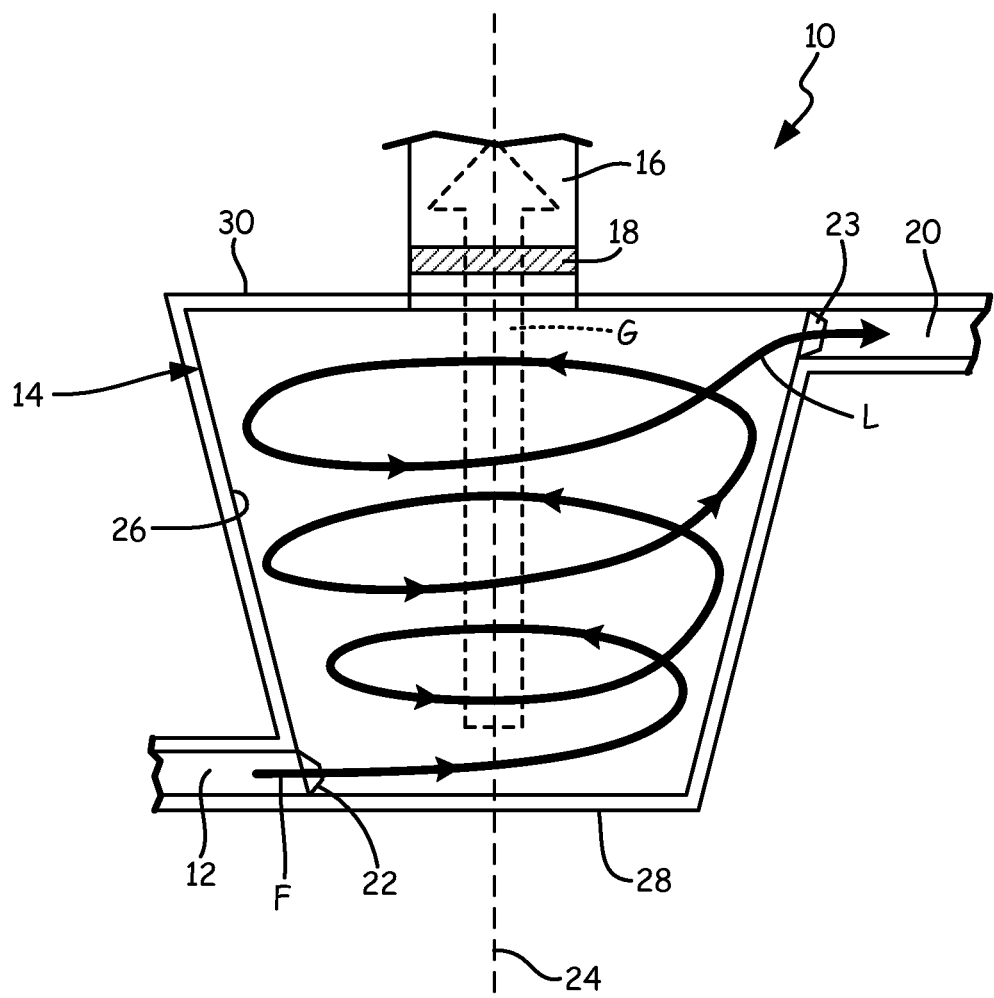
FIG. 1 is a cross section view of one embodiment of a vortex separator.

FIG. 1 illustrates a cross section view of one embodiment of a vortex separator. As shown, vortex separator 10 includes fluid inlet line 12, vortex chamber 14, gas outlet line 16, membrane 18 and liquid outlet line 20. Fluid F enters vortex separator 10 and separates into a gas stream (stream G) and a liquid stream (stream L).

Fluid F enters vortex chamber 14 through fluid inlet line 12. Fluid F contains both a gas and a liquid. Fluid F can be a two-phase fluid in which the gas and the liquid enter vortex chamber 14 as a fluid mixture. Fluid F can also be a liquid containing one or more dissolved gases. In some embodiments, fluid F enters vortex chamber 14 from fluid inlet line 12 through nozzle 22. Nozzle 22 can increase the velocity of fluid F and/or modify the direction of flow of fluid F as it enters vortex chamber 14. As described below in greater detail, fluid F must enter vortex chamber 14 at a velocity and direction suitable to form a vortex within vortex chamber 14.

Vortical flow of fluid F within vortex chamber 14 separates fluid F into separate streams of gas (stream G) and liquid (stream L). Vortex chamber 14 is a chamber or vessel having a circular cross section. In the embodiment illustrated in FIG. 1, vortex chamber 14 has a frustoconical shape. Centerline axis 24 extends through the center of vortex chamber 14 as shown in FIG. 1. Vortex chamber 14 includes frustum wall 26 extending from first end 28 to second end 30. As shown in FIG. 1, first end 28 has a smaller diameter than second end 30 with frustum wall 26 expanding radially from the edges of first end 28 to the edges of second end 30. As a result of this configuration, a greater proportion of vortex chamber 14's volume is located near second end 30 than first end 28.

As shown in FIG. 1, fluid inlet line 12 and nozzle 22 are located near first end 28 of vortex chamber 14. Gas outlet line 16, membrane 18 and liquid outlet line 20 and located near second end 30 of vortex chamber 14. Gas outlet line 16 extends from second end 30 and communicates with vortex chamber 14 through an opening in second end 30. As shown in FIG. 1, centerline axis 24 passes through gas outlet line 16.

In the embodiment shown in FIG. 1, membrane 18 is positioned within gas outlet line 16. Membrane 18 is a selective barrier that allows gases to pass through the membrane while substantially preventing liquids from passing through the membrane. Membrane 18 prevents liquid from continuing downstream through gas outlet line 16. Depending on the liquid(s) present in fluid F (and liquid stream L), membrane 18 can be hydrophobic or lipophobic/oleophobic. For example, in cases in which fluid F contains water, membrane 18 is typically hydrophobic. In these embodiments, hydrophobic membrane 18 repels water, substantially preventing water from exiting vortex chamber 14 through gas outlet line 16. Suitable materials for use in hydrophobic membrane 18 include polytetrafluoroethylene, polypropylene, polyethylene and combinations thereof. In cases in which fluid F contains a non-polar liquid, membrane can be lipophobic or oleophobic. In these embodiments, lipophobic/oleophobic membrane 18 repels non-polar liquids, substantially preventing them from exiting vortex chamber 14 through gas outlet line 16. Suitable materials for use in lipophobic/oleophobic membrane 18 include polytetraflouroethylene, polyvinylidene difluoride and combinations thereof.

Liquid outlet line 20 is also located near second end 30. As membrane 18 prevents liquid from exiting through gas outlet 16, liquid stream L exits vortex chamber 14 through liquid outlet line 20. The pressure difference between fluid inlet line 12 and outlet line 20 encourages liquid stream L to flow out of vortex chamber 14 and into liquid outlet line 20. In the embodiment shown in FIG. 1, liquid stream L exits vortex chamber 14 through nozzle 23 as it passes into liquid outlet line 20. Exit nozzle 23 can be designed and shaped to reduce turbulence of liquid stream L as it leaves vortex chamber 14 and enters liquid outlet line 20.

While vortex separator 10 illustrated in FIG. 1 shows fluid inlet 12 located near the end of vortex chamber 14 having a smaller diameter and gas outlet line 16 and liquid outlet line 20 located near the end of vortex chamber 14 having a larger diameter, in other embodiments the fluid inlet line, gas outlet line and liquid outlet line are reversed. In these embodiments, fluid inlet 12 is located near the end of vortex chamber 14 having a greater diameter and gas outlet line 16 and liquid outlet line 20 located near the end of vortex chamber 14 having a smaller diameter.

During operation of vortex separator 10, fluid F enters vortex chamber 14 from fluid inlet line 12. Nozzle 22 directs the flow of fluid F within vortex chamber 14 so that a vortex is formed and fluid F follows a vertical flow pattern. Velocity and flow direction play an important role in forming a vortex within vortex chamber 14. If the fluid velocity is too low, no vortex will form. If the velocity is too high, excessive turbulence can disrupt vortex formation. The required velocity and direction of fluid flow depend in large part on the size of vortex chamber 14, the fluid density and its mass flow. Fluid F can be introduced into vortex chamber 14 at various temperatures. As fluid F flows along expanding frustum wall 26, centrifugal forces separate the gases from the liquid present in fluid F due to the difference in densities between gas and liquid. As shown in FIG. 1, liquid stream L follows a generally conic helical flow path along frustum wall 26, while gas stream G moves towards the center of vortex chamber 14. Gas present in gas stream G within vortex chamber 14 is at a higher pressure than gas present in gas outlet line 16. This pressure gradient causes the gas entrained within fluid F to act similar to the way it would act if subjected to buoyancy forces, flowing to the relatively lower pressure region at the center of vortex chamber 14 (when compared to the liquid flow at the regions around frustum wall 26), and then out of vortex chamber 14, across membrane 18 and into gas outlet line 16 as shown by the dashed arrow in FIG. 1. At the same time, liquid present in liquid stream L within vortex chamber 14 is at a higher pressure than liquid present in liquid outlet line 20. This pressure gradient causes the liquid in liquid stream L to flow out of vortex chamber 14 and into liquid outlet line 20 as shown by the solid arrow in FIG. 1. Since membrane 18 substantially prevents transmission of liquid, liquid stream L is forced to exit vortex chamber through liquid outlet line 20. In some embodiments, the pressure difference between vortex chamber 14 and gas outlet line 16/liquid outlet line 20 is between about 34 kPa (5 psi) and about 276 kPa (40 psi).

In some cases, fluid F contains solid contaminants in addition to the gas and liquid. The density of solid contaminant particles within fluid F will generally cause the solid particles to follow the path of liquid stream L rather than gas stream G. Alternatively, in terrestrial applications, solid contaminant particles may have a density high enough that they are not carried by liquid stream L and instead fall to the bottom of vortex chamber 14. Since liquid stream L does not pass through membrane 18, solid contaminants will generally not encounter membrane 18 to clog pores of the membrane or otherwise cause membrane deterioration. Thus, the useful lifetime of membrane 18 can be extended when compared to other techniques in which solid contaminants may regularly contact a membrane or filter. Similarly, bacteria may form on membrane 18 when certain fluids are delivered to vortex separator 10. The turbulent, swirling fluid flow at start up and shut down can assist in removing bacteria from membrane 18, preventing deterioration due to bacterial contamination.

While liquid stream L is prevented from exiting vortex chamber 14 through gas outlet line 16, gas stream G can carry some liquid as moisture across membrane 18. For example, in an embodiment in which vortex separator separates air from water, the air passing through membrane 18 can carry water vapor. In some embodiments the humidity of gas stream G passing through membrane 18 can be at or near 100%.

Once liquid stream L has exited vortex chamber 14 through liquid outlet line 20, the liquid is substantially free of gases and can be used in pumps, heat exchangers or for other purposes that require a liquid that does not contain gases. Once gas stream G has exited vortex chamber 14 through gas outlet line 16, it can be repurposed or dumped overboard. In some embodiments, vortex separator 10 processes between about 4.6 kg (10 pounds) and about 90.9 kg (200 pounds) of fluid per hour.

Figure 2:
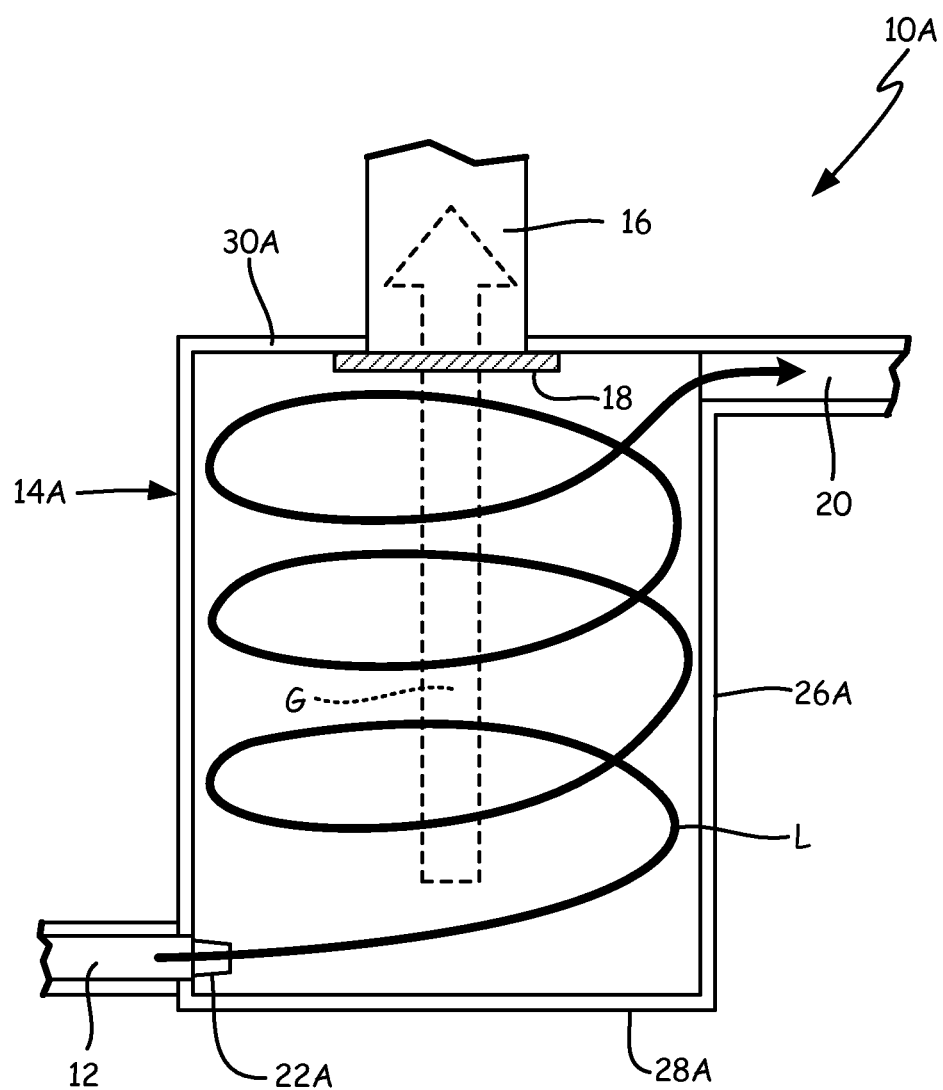
FIG. 2 is a cross section view of another embodiment of a vortex separator.

FIG. 2 illustrates another embodiment of a vortex separator. Vortex separator 10A differs from vortex separator 10 shown in FIG. 1 in a few respects. First, vortex separator 10A is cylindrical rather than frustoconical. Cylindrical wall 26A extends from first end 28A to second end 30A. First end 28A and second end 28A have substantially equal diameters. Since wall 26A does not expand radially as it extends from first end 28A to second end 30A, nozzle 22A directs fluid F at angle away from first end 28A to encourage vortex formation. Second, membrane 18 is positioned within vortex chamber 14A rather than gas outlet line 16. Here, membrane 18 is positioned adjacent second end 30A to cover the opening in second end 30A that leads to gas outlet 16. Vortex separator 10A functions as described above with respect to vortex separator 10 of FIG. 1.

Vortex separator 10 (and 10A) provides an apparatus that can be used to separate gas from liquid. A fluid containing a liquid and a gas is delivered at a velocity and direction sufficient to create vertical flow of the fluid within the vortex chamber. A membrane prevents liquid from entering the gas outlet so that liquid is removed through the liquid outlet and gas is removed through the gas outlet.

Vortex separator 10 does not require a motor to spin the fluid, reducing power requirements as well as overall system weight and space requirements. As noted above, vortex separator 10 can also provide an increased useful life of membrane 18 when compared to other membrane separation techniques. A longer membrane life reduces the amount of maintenance and costs of replacing the membrane. In most microgravity applications and environments, power consumption, volume and weight are critical factors. The potential for weight and volume reduction and reduced use of power resources for vortex separator 10 make it an exemplary apparatus for microgravity applications such as liquid cooled garments for spacesuits and heat exchange systems on board spacecraft. Vortex separator 10 can also find application in terrestrial environments, such as degassing fluids in a laboratory.

Discussion of Possible Embodiments

The following are non-exclusive descriptions of possible embodiments of the present invention.

A vortex separator can include a vortex chamber having a circular cross section, an inlet for delivering a fluid to the vortex chamber, a gas outlet through which gas present in the fluid exits the vortex chamber, a membrane positioned to substantially prevent liquid from passing through the gas outlet, and a liquid outlet through which liquid present in the fluid exits the vortex chamber.

The vortex separator of the preceding paragraph can optionally include, additionally and/or alternatively, any one or more of the following features, configurations and/or additional components:

A further embodiment of the foregoing vortex separator can include a hydrophobic membrane.

A further embodiment of any of the foregoing vortex separators can include a vortex chamber having a centerline axis where the centerline axis passes through the membrane and the gas outlet.

A further embodiment of any of the foregoing vortex separators can include that the hydrophobic membrane includes a polymer selected from the group consisting of polytetrafluoroethylene, polypropylene, polyethylene and combinations thereof.

A further embodiment of any of the foregoing vortex separators can include a vortex chamber having a cylindrical shape.

A further embodiment of any of the foregoing vortex separators can include a vortex chamber having a first end, a second end generally opposite the first end, and a cylindrical wall extending from the first end to the second end, where the inlet is positioned on the cylindrical wall near the first end, the liquid outlet is positioned on the cylindrical wall near the second end and the gas outlet is positioned along the second end.

A further embodiment of any of the foregoing vortex separators can include a vortex chamber having a frustoconical shape.

A further embodiment of any of the foregoing vortex separators can include a vortex chamber having a first end with a first diameter, a second end with a second diameter greater than the first diameter, and a frustum wall extending from the first end to the second end, where the inlet is positioned on the frustum wall near the first end, the liquid outlet is positioned on the frustum wall near the second end and the gas outlet is positioned along the second end.

A further embodiment of any of the foregoing vortex separators can include a nozzle shaped to deliver fluid into the vortex chamber at a sufficient velocity and a direction to create vortical flow of the fluid within the vortex chamber.

A further embodiment of any of the foregoing vortex separators can include a nozzle shaped to reduce turbulence of the liquid as it exits the vortex chamber.

A further embodiment of any of the foregoing vortex separators can include that the membrane is positioned within the gas outlet.

A further embodiment of any of the foregoing vortex separators can include that the membrane is positioned within the vortex chamber upstream of the gas outlet.

A vortex chamber can include a first end, a second end generally opposite the first end, a wall extending from the first end to the second end, a fluid inlet located on the wall near the first end, a liquid outlet located on the wall near the second end, a gas outlet located along the second end, and a membrane for allowing the transmission of a gas through the gas outlet but substantially preventing transmission of liquids through the gas outlet.

A method for separating a gas from a liquid can include delivering a fluid containing a liquid and a gas to a vortex chamber through a nozzle at a velocity and direction sufficient to create vortical flow of the fluid within the vortex chamber, removing the liquid contained within the fluid from the vortex chamber through a liquid outlet, and removing the gas contained within the fluid from the vortex chamber through a gas outlet. One of the vortex chamber or the gas outlet can include a membrane that prevents liquid from exiting through the gas outlet.

The method of the preceding paragraph can optionally include, additionally and/or alternatively, any one or more of the following features, configurations and/or additional components:

A further embodiment of the foregoing method can include a hydrophobic membrane.

A further embodiment of any of the foregoing methods can include a centerline axis where the centerline axis passes through the membrane and the gas outlet.

A further embodiment of any of the foregoing methods can include that the hydrophobic membrane includes a polymer selected from the group consisting of polytetrafluoroethylene, polypropylene, polyethylene and combinations thereof.

A further embodiment of any of the foregoing methods can include a vortex chamber has a cylindrical shape.

A further embodiment of any of the foregoing methods can include a vortex chamber having a first end, a second end generally opposite the first end, and a cylindrical wall extending from the first end to the second end, where the inlet is positioned on the cylindrical wall near the first end, the liquid outlet is positioned on the cylindrical wall near the second end and the gas outlet is positioned along the second end.

A further embodiment of any of the foregoing methods can include a vortex chamber has a frustoconical shape.

A further embodiment of any of the foregoing methods can include a vortex chamber having a first end with a first diameter, a second end with a second diameter greater than the first diameter, and a frustum wall extending from the first end to the second end, where the inlet is positioned on the frustum wall near the first end, the liquid outlet is positioned on the frustum wall near the second end and the gas outlet is positioned along the second end.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for separating a gas from a liquid, the method comprising:
   delivering a fluid containing a liquid and a gas to a vortex chamber through a nozzle at a velocity and direction sufficient to create vortical flow of the fluid within the vortex chamber, wherein the nozzle is located proximate a first end of the vortex chamber;
   removing the liquid contained within the fluid from the vortex chamber through a liquid outlet, wherein the liquid outlet is located proximate a second end of the vortex chamber opposite the first end; and
   removing the gas contained within the fluid from the vortex chamber through a gas outlet, wherein the gas outlet is located on the second end, and wherein one of the vortex chamber or the gas outlet includes a membrane that prevents liquid from exiting through the gas outlet.

2. The method of claim 1, wherein the membrane is a hydrophobic membrane.

3. The method of claim 1, wherein the vortex chamber comprises a centerline axis, and wherein the centerline axis passes through the membrane and the gas outlet.

4. The method of claim 2, wherein the hydrophobic membrane comprises a polymer selected from the group consisting of polytetrafluoroethylene, polypropylene, polyethylene and combinations thereof.

5. The method of claim 1, wherein the vortex chamber has a cylindrical shape.

6. The method of claim 5, wherein the vortex chamber comprises:
   a first end;
   a second end generally opposite the first end; and
   a cylindrical wall extending from the first end to the second end, wherein the inlet is positioned on the cylindrical wall proximate the first end, the liquid outlet is positioned on the cylindrical wall proximate the second end and the gas outlet is positioned along the second end.

7. The method of claim 1, wherein the vortex chamber has a frustoconical shape.

8. The method of claim 7, wherein the vortex chamber comprises:
   a first end having a first diameter;
   a second end having a second diameter greater than the first diameter; and
   a frustum wall extending from the first end to the second end, wherein the inlet is positioned on the frustum wall proximate the first end, the liquid outlet is positioned on the frustum wall proximate the second end and the gas outlet is positioned along the second end.

* * * * *